United States Patent
Childers

(10) Patent No.: US 9,983,365 B2
(45) Date of Patent: May 29, 2018

(54) MODIFIED MT FERRULE WITH REMOVED CANTILEVERED FIBERS AND INTERNAL LENSES AND MOLD PIN

(71) Applicant: US Conec, Ltd., Hickory, NC (US)

(72) Inventor: Darrell R. Childers, Hickory, NC (US)

(73) Assignee: US Conec, Ltd., Hickory, NC (US)

( * ) Notice: Subject to any disclaimer, the term of this patent is extended or adjusted under 35 U.S.C. 154(b) by 18 days.

(21) Appl. No.: 14/622,442

(22) Filed: Feb. 13, 2015

(65) Prior Publication Data

US 2015/0226922 A1  Aug. 13, 2015

Related U.S. Application Data

(60) Provisional application No. 61/939,508, filed on Feb. 13, 2014.

(51) Int. Cl.
  *G02B 6/38* (2006.01)
  *G02B 6/36* (2006.01)

(52) U.S. Cl.
  CPC ......... *G02B 6/3853* (2013.01); *G02B 6/3885* (2013.01); *G02B 6/3644* (2013.01); *G02B 6/3861* (2013.01)

(58) Field of Classification Search
  None
  See application file for complete search history.

(56) References Cited

U.S. PATENT DOCUMENTS

| 2003/0113077 A1* | 6/2003 | Xu | G02B 6/4204 |
| | | | 385/93 |
| 2012/0033920 A1* | 2/2012 | Haley | G02B 6/3834 |
| | | | 385/78 |

* cited by examiner

*Primary Examiner* — Jerry Rahll
(74) *Attorney, Agent, or Firm* — Michael L. Leetzow, P.A.

(57) ABSTRACT

A modified MT fiber optic ferrule has optical fiber receiving holes by the front end to receive the ends of optical fibers inserted into and through the ferrule. The optical fiber receiving holes are aligned with optical fiber openings in the center of the ferrule and have lenses formed in the optical fiber receiving holes to collimate from or focus light into the optical fibers in the fiber optic ferrules. The front end of the fiber optic ferrule may also have integral mating surfaces.

18 Claims, 9 Drawing Sheets

MODIFIED MT FERRULE WITH REMOVED CANTILEVERED FIBERS AND INTERNAL LENSES AND MOLD PIN

REFERENCE TO RELATED CASE

This application claims priority under 35 U.S.C. § 119 (e) to provisional application No. 61/939,508 filed on Feb. 13, 2014, the content of which is hereby incorporated by reference in its entirety.

BACKGROUND OF THE INVENTION

Field of the Invention

Optical fiber ferrules are typically mated to another ferrule in a larger system to mate the light traveling down optical fibers. The light exiting an optical fiber tends to diverge. As a result, some fiber optic ferrules have lenses on the front face to collimate the diverging light as it exits from the optical fibers. The mating fiber optic ferrule, also having lenses, causes the collimated light to be focused into the optical fibers disposed in the mating fiber optic ferrule. However, the alignment of the optical fibers with the lenses in the ferrules is critical to maintain a low insertion loss between the two fiber optic ferrules. Typically, the optical fibers are inserted until they engage a optical fiber stop plane. However, even with the most cautious insertion techniques, the optical fibers may deflect or even bend within the fiber optic ferrule. If the tips of the optical fibers are bent, then the exiting light may not be adequately collimated by the lenses (or focused by the lenses in the mated fiber optic ferrule), causing a high insertion loss.

Thus, an fiber optic ferrule is needed that allows for the optical fibers inserted into the fiber optic ferrule to be aligned with lenses in an easy and straightforward manner.

SUMMARY OF THE INVENTION

The present invention is directed to fiber optic ferrule that includes a main body having a front end, a back end, and a middle portion disposed between the front end and back end, a first opening through the back end of the main body, the first opening configured to receive at least two optical fibers through the back end of the main body, a plurality of optical fiber openings disposed in the middle portion and in communication with and extending from the first opening toward the front end, each of the plurality of optical fiber openings configured to receive an optical fiber inserted through the back end, a second opening disposed between the middle portion and the front end, the second opening extending through a surface of the main body perpendicular to a front face disposed at the front end of the main body, and a front portion, the front portion disposed between the second opening and the front end, the front portion having a plurality of optical fiber receiving holes, each of the plurality of optical fiber receiving holes corresponding to one of the plurality of optical fiber openings in the middle portion and opening into the second opening.

According to another aspect of the present invention, a fiber optic ferrule is provided that includes a main body having a front end, a back end, and a middle portion disposed between the front end and back end, a first opening through the back end of the main body, the first opening configured to receive at least one optical fiber through the back end of the main body, and at least one optical fiber opening in communication with and extending from the first opening toward the front end, the at least one optical fiber opening configured to receive an optical fiber inserted through the back end, wherein the at least one optical fiber opening has a lens, the lens having a diameter that is equal to or small than a diameter of the at least one fiber opening.

In yet another aspect, a molding pin for use in molding a fiber optic ferrule includes a main body having a proximal end and a distal end, and an end portion at the distal end, the end portion having a convex configuration for forming a lens in the fiber optic ferrule Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
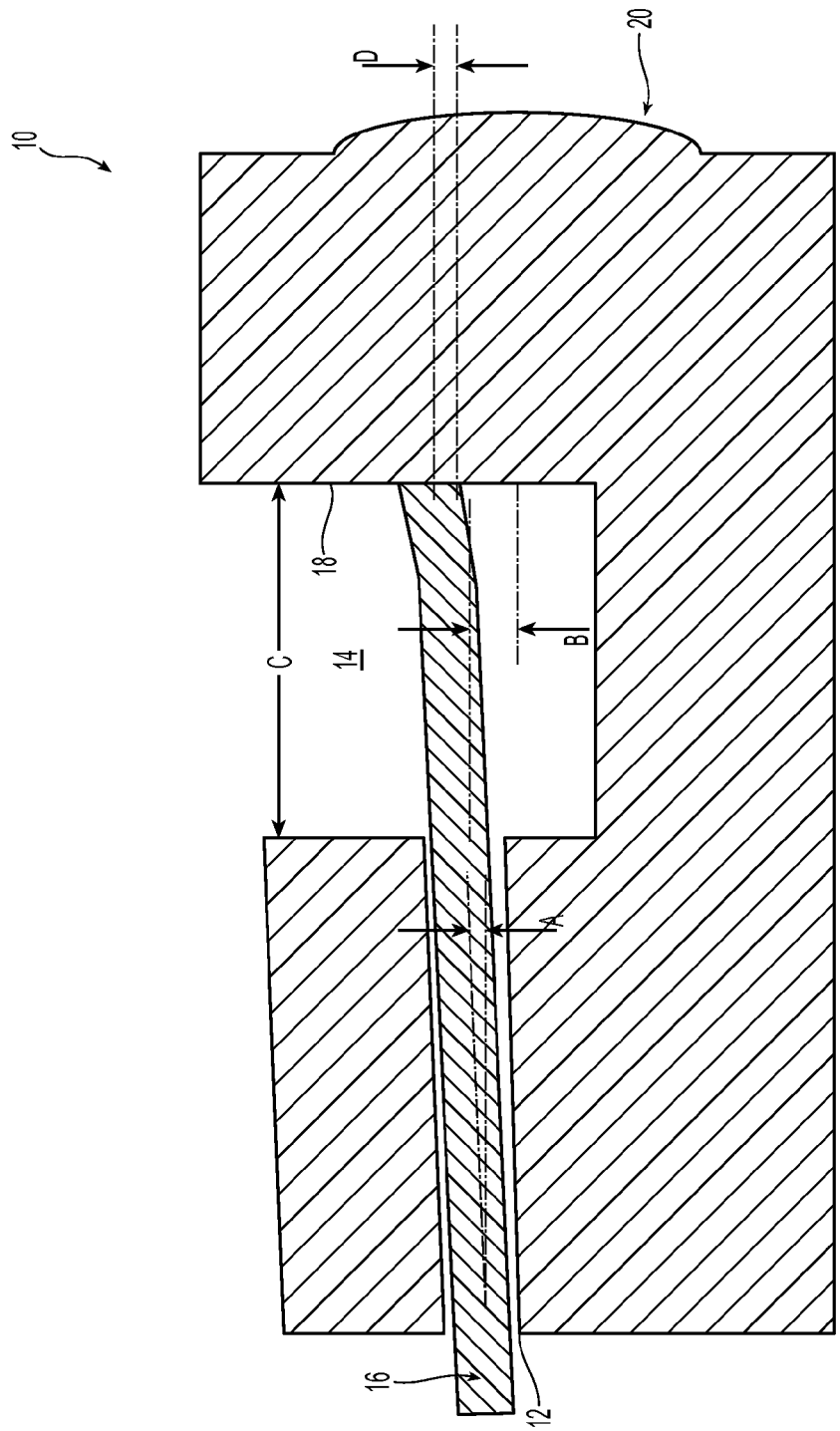
FIG. 1 is a schematic of a cross section of a prior art ferrule.

Reference will now be made in detail to the present preferred embodiment(s) of the invention, examples of which are illustrated in the accompanying drawings. Whenever possible, the same reference numerals will be used throughout the drawings to refer to the same or like parts.

Referring to FIG. 1 where a portion of a prior art fiber optic ferrule 10 is illustrated. The fiber optic ferrule 10 has a middle portion with a plurality of optical fiber openings 12 that are in communication with a larger opening 14. The optical fibers 16 are inserted into the plurality of optical fiber openings 12 and pass through the larger opening 14 to the perpendicular surface 18. The perpendicular surface 18 functions as a stop plane. While the optical fibers 16 may remain perfectly straight when they make contact with the perpendicular surface 18, they may also bend as illustrated. If the optical fibers 16 bend, then the light is not directed at the lenses 20 that are on the front face of the fiber optic ferrule 10. The plurality of optical fiber openings 12 may also not be perfectly aligned with the lenses 20 during the molding of the fiber optic ferrule 10. As illustrated, the optical fiber openings 12 may be formed an angle A relative to the center line of the fiber optic ferrule and the axis of the lenses 20. The larger opening 14 has a distance C and B is offset of the optical fiber 16 as it exits from the optical fiber openings 12 and the focal point or the center of the ferrule and the lenses 20. The bending of the optical fiber 16 due to improper insertion, debris, or shrinkage of the adhesive during curing is measure by D. As a result, the total offset of the fiber tip from the ideal location is B+C sin A+D.

Turning now to one embodiment of a fiber optic ferrule 50 according to the present invention, the fiber optic ferrule 50 has a main body 52 with a front end 54 and a back end 56 as illustrated in FIGS. 2-4B. Between the front end 54 and the back end 56 is a middle portion 58. The fiber optic ferrule 50 has a first opening 60 through the back end 56 of the main body 52 to receive optical fibers 16. The fiber optic ferrule 50 has a plurality of optical fiber openings 62 disposed within the middle portion 58 of the main body 52. The plurality of optical fiber openings 62 extend from the first opening 60 forward towards the front end 54. The plurality of optical fiber openings 62 are configured to receive the optical fibers fibers 16 inserted through the back end 56. The optical fibers 16 extend from the back end 56 through the middle portion 58 to an optical fiber stop 63. See FIGS. 4A and 4B. the optical fiber stop 63 is a slight narrowing in each of the plurality of optical fiber openings 62. This narrowing creates a shoulder that engages at least a portion of an outer front face of the optical fibers 16. See, e.g., FIG. 4B. The optical fiber stop 63 is created by the shoulder 212 in a molding pin, which is described in detail below and with reference to FIG. 8. As a result of this configuration, the optical fibers 16 are supported and secured by the plurality of optical fiber openings 62, thereby preventing any bending of the optical fibers 16 as illustrated in FIG. 1.

Figure 2:
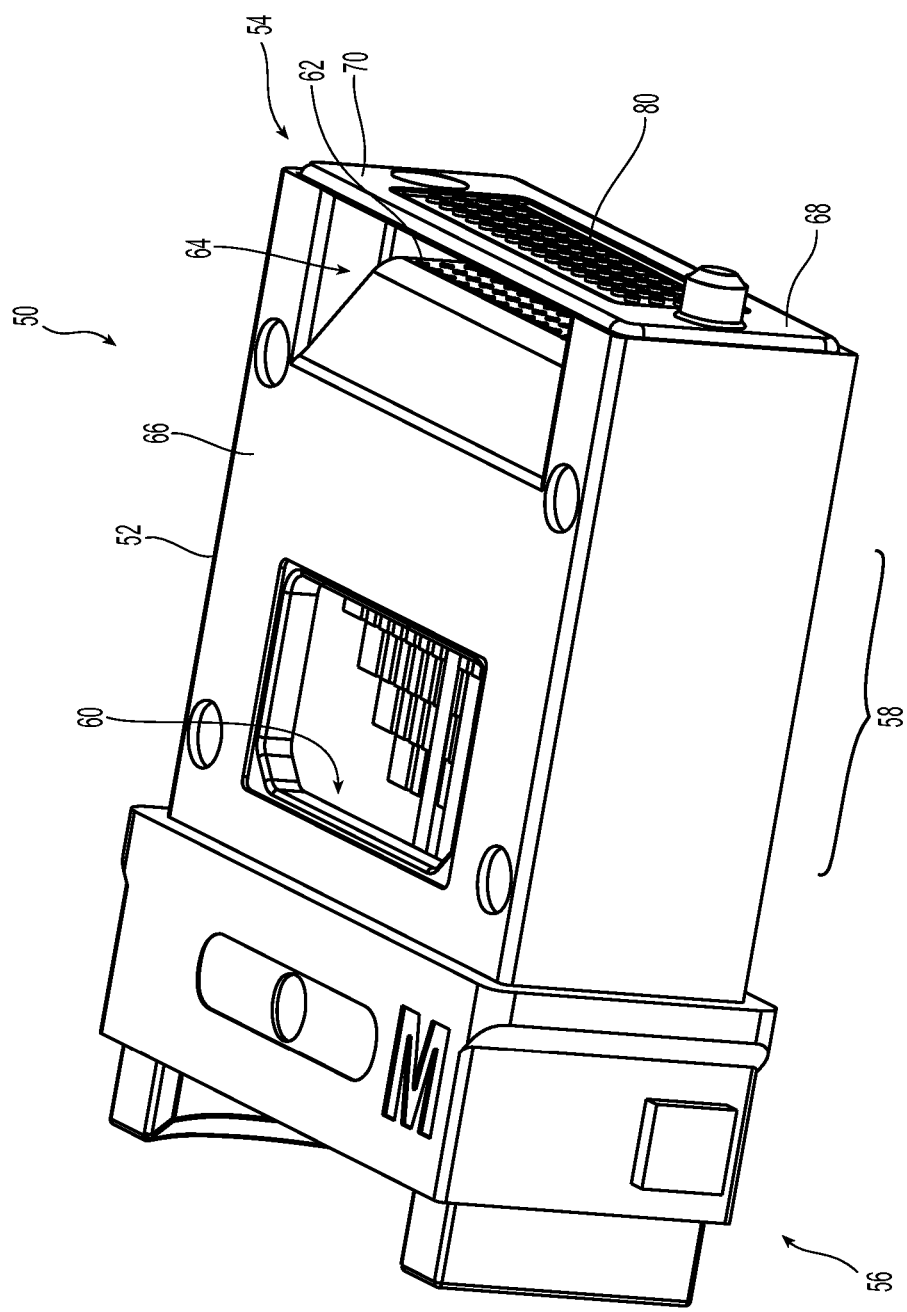
FIG. 2 is a perspective view of one embodiment of a fiber optic ferrule according to the present invention.
Figure 3:
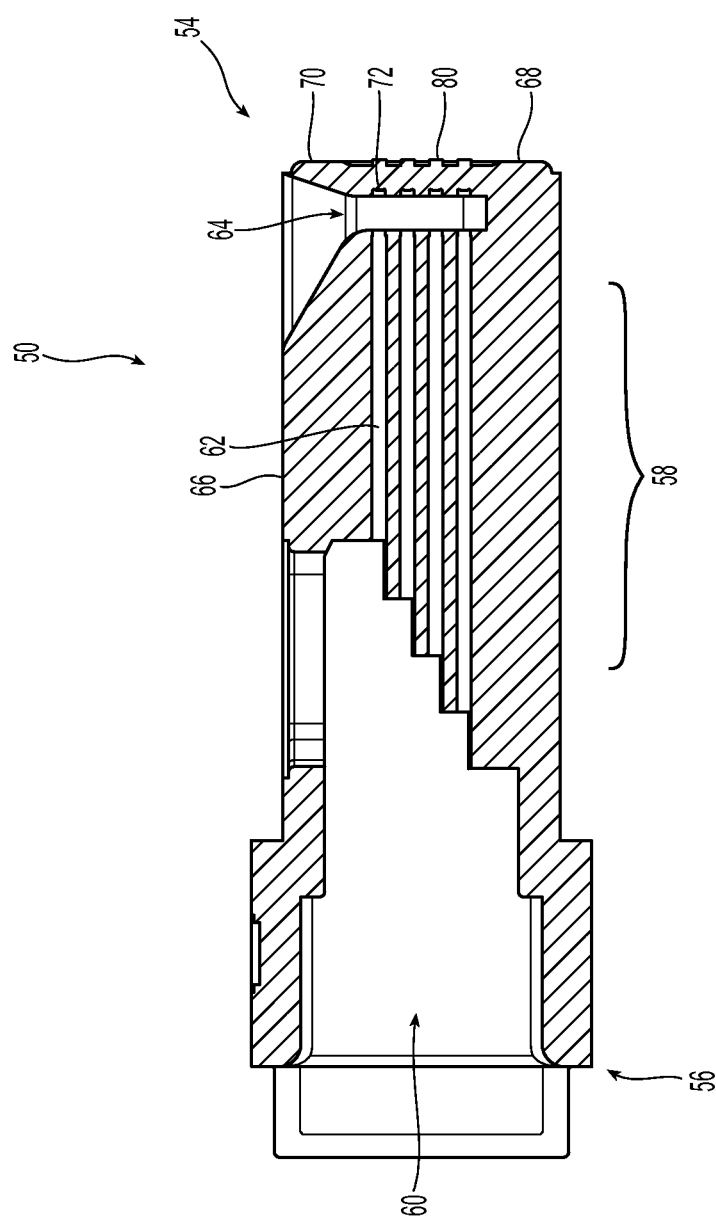
FIG. 3 is a cross-sectional view of the fiber optic ferrule of FIG. 2.

As illustrated in FIGS. 2 and 3, the plurality of optical fiber openings 62 terminate at a second opening 64. The second opening 64 is configured to receive an adhesive (preferably epoxy that has a refractive index that is different from that of the fiber optic ferrule 50) in order to secure the optical fibers within the fiber optic ferrule 50. The second opening 64 is illustrated as opening through a top surface 66 of the fiber optic ferrule 50. As would be known in the art, the second opening 64 could be through another surface of the fiber optic ferrule 50 that is perpendicular to the front face 68 of the fiber optic ferrule 50.

A front portion 70 is disposed between the second opening 64 in the front end 54. In the front portion 70 are a plurality of lens holes 72. See FIG. 4. The lens holes 72 are in line with and are a continuation of the optical fiber openings 62. Typically, openings such as the lens holes 72 would be created using a second element, i.e., not the same pin that is used to create the plurality of optical fiber openings 62. However, as noted below in detail, the same molding pin (molding pin 200) is used to create both the optical fiber opening 62 and the lens holes 72. Using a single pin eliminates the stacking of tolerances for separate elements and provides an accurate alignment of the optical fiber opening 62 and the lens holes 72.

While a plurality of optical fiber openings 62 and the lens holes 72 are illustrated, it is possible to have fewer (or even more) openings and holes in a fiber optic ferrule than illustrate in the figures. Indeed, it would be possible to create such a optical fiber opening and the optical fiber receiving hole in a single fiber ferrule.

Figure 4:
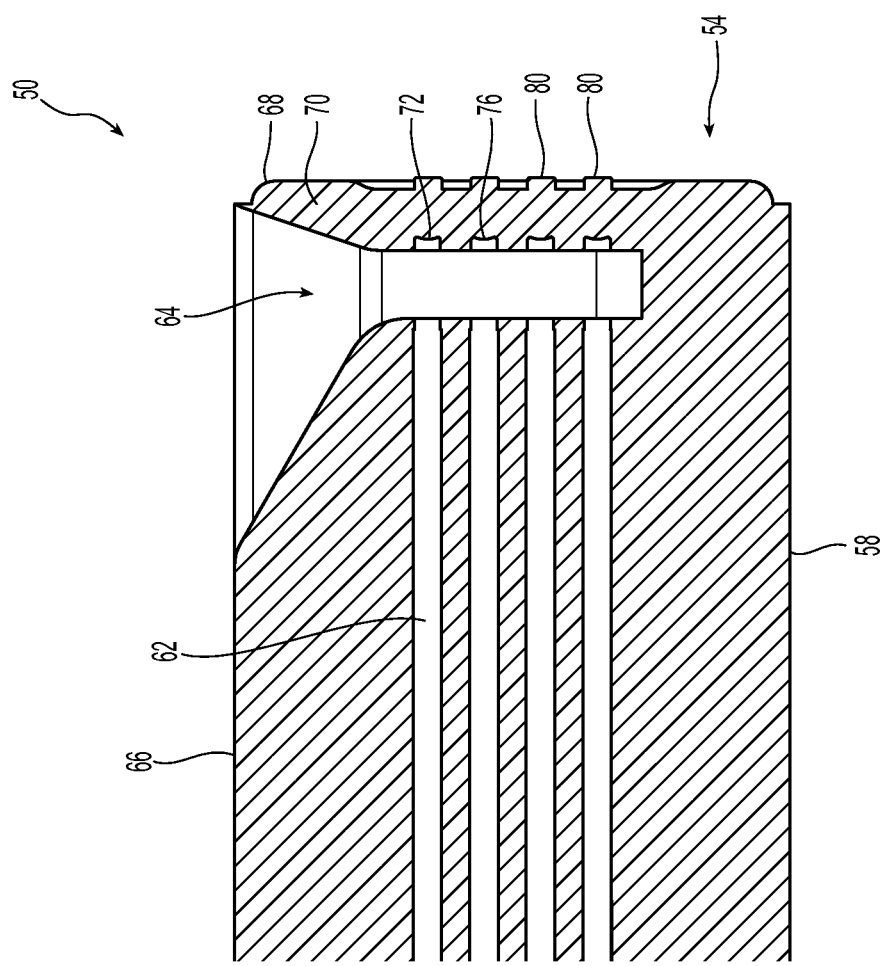
FIG. 4 is an enlarged view of the front end of the fiber optic ferrule of FIG. 2.
Figure 4A:
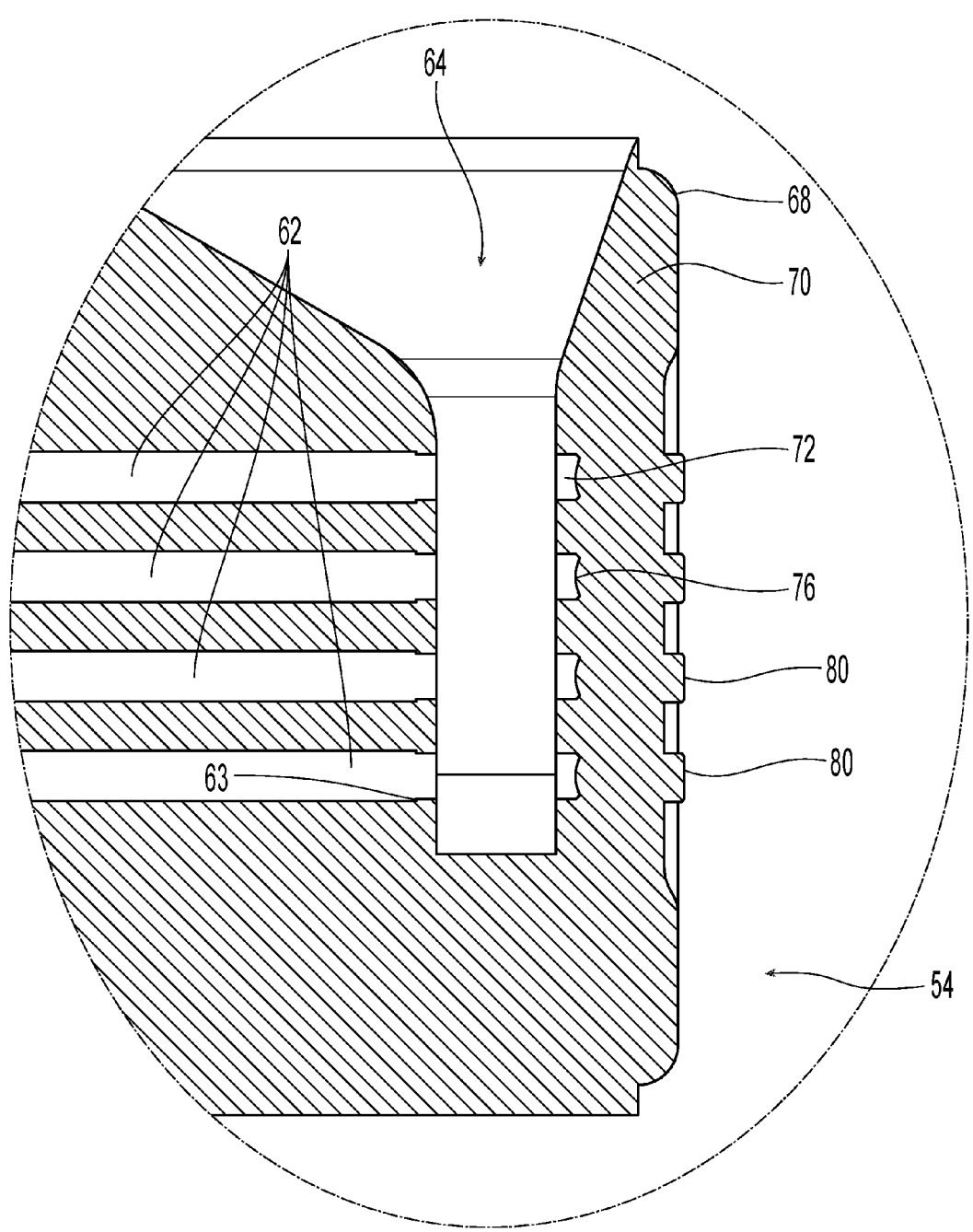
FIG. 4A is an enlarged view of a portion of the front end of the fiber optic ferrule in FIG. 3.
Figure 4B:
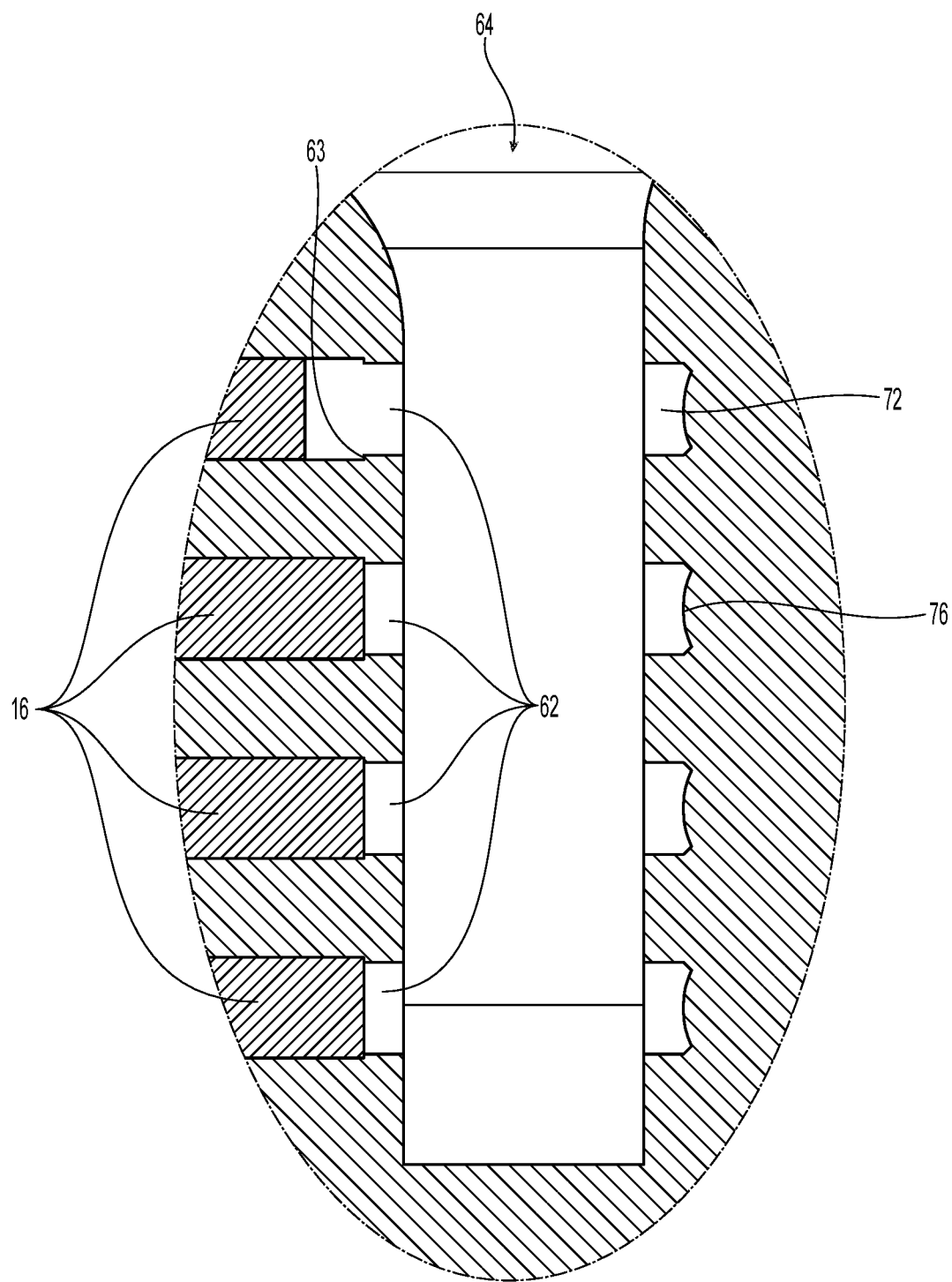
FIG. 4B is an enlarged view of the fiber optic ferrule in FIG. 3 with three optical fibers inserted and disposed against a fiber stop and one optical fiber being inserted and illustrated before engaging the fiber stop.

As seen in FIGS. 4, 4A and 4B, the right side of the lens holes 72 has a lens 76 formed in the fiber optic ferrule 50. The lens 76 is a convex lens that collimates the light exiting from the optical fibers 16 disposed against the optical fiber stop 63 in the plurality of optical fiber openings 62 and travels through the second opening 64 to the lenses 76. The position of the optical fiber stop 63 is based upon the focal length of the lens 76, i.e., the distance from the optical fiber stop 63 to the lens 76 is the same as the focal length of the lens 76. The light then travels through the front portion 70 to the mating surfaces 80 that are in optical alignment with the lens holes 72. As illustrated in FIG. 4, the mating surfaces 80 extend beyond the front face 68 of the fiber optic ferrule 50. When fiber optic ferrule 50 is mated with another fiber optic ferrule, the mating surfaces 80 would engage one another, thereby allowing the light to pass through the corresponding lenses in the other fiber optic ferrule and be focused onto and into the optical fiber. Since the mating surfaces 80 project past the front face 68 of the fiber optic ferrule 50, any air gaps between the two fiber optic ferrules will be eliminated. By eliminating the gaps between the fiber optic ferrules, fresnel losses will be eliminated. However, it should be noted that a fiber optic ferrule need not have such mating surfaces at the front face 68 of the fiber optic ferrule 50.

Figure 5:
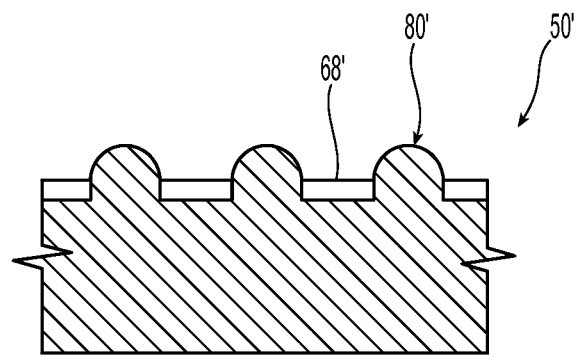
FIG. 5 is an enlarged view of a front end of a fiber optic ferrule illustrating alternative mating surfaces.

An alternative configuration for mating surfaces 80' of fiber optic ferrule 50' is illustrated in FIG. 5. Rather than a flat engaging surface on the mating surfaces 80 as illustrated in FIG. 4, the mating surfaces 80' may have a convex configuration as illustrated in FIG. 5. The convex configuration of mating surfaces 80' would increase the deformation of the ferrule mating surfaces, thereby eliminating any air gaps between the fiber optic ferrules.

Figure 6:
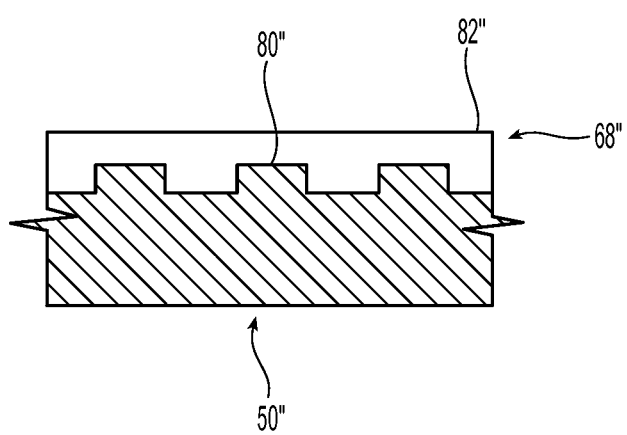
FIG. 6 is an enlarged view of a front end of a fiber optic ferrule illustrating alternative mating surface with light transmission surfaces recessed on a front face of the fiber optic ferrule.

FIG. 6 illustrates another configuration for the front face 68" of a fiber optic ferrule 50". In this case, the mating surfaces become light transmission surfaces 80" as the light transmission surfaces 80" are recessed below the front face 68" of the fiber optic ferrule 50". Instead of the transmission surfaces 80" engaging one another in a mating situation, an outwardly extending surface 82" is used to engage other fiber optic ferrules.

Figure 7:
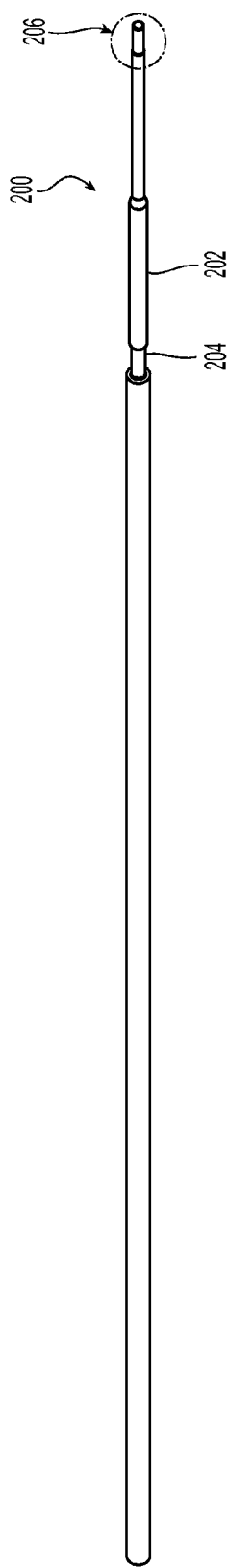
FIG. 7 is a perspective view of one embodiment of a molding pin used to create an optical fiber opening in a fiber optic ferrule according to the present invention.
Figure 8:
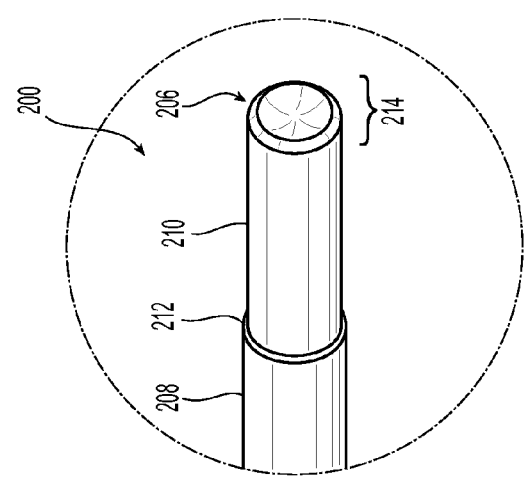
FIG. 8 is an enlarged view of the distal end of the molding pin of FIG. 7.
Figure 9:
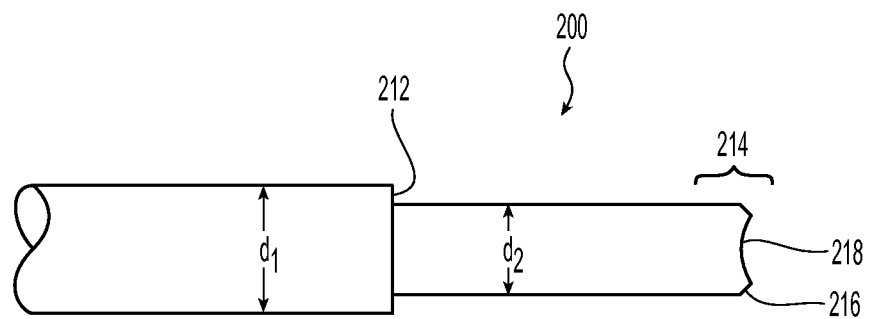
FIG. 9 is a cross-sectional view of the distal end of the molding pin of FIG. 7.
Figure 10:
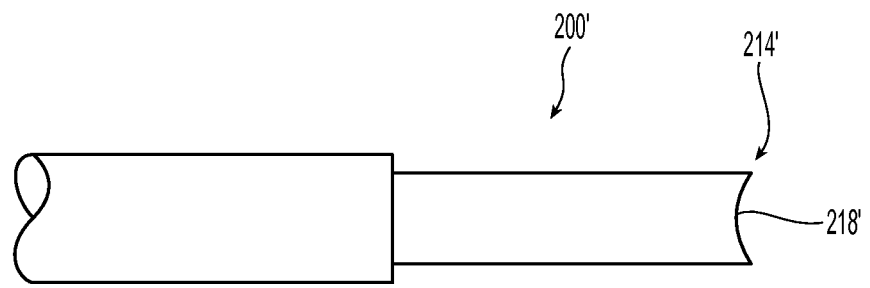
FIG. 10 is a cross-sectional view of the distal end of an alternative embodiment of a molding pin according to the present invention.
Figure 11:
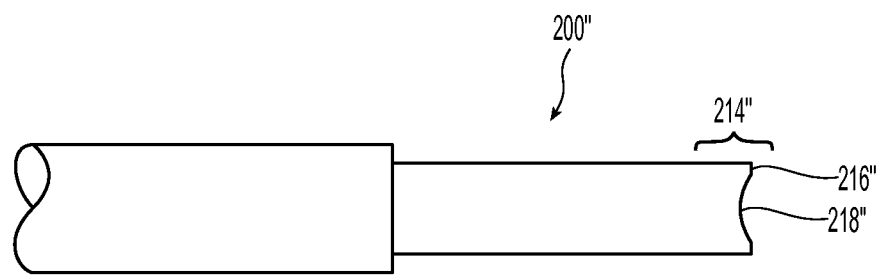
FIG. 11 is a cross-sectional view of the distal end of a second alternative embodiment of a molding pin according to the present invention.

A molding pin 200 used with a mold to make a fiber optic ferrule is illustrated in FIGS. 7-9. The molding pin 200 has a main body 202 with a proximal end 204 and a distal end 206. The length of the molding pin 200 is as long as necessary given the fiber optic ferrule being molded. While the molding pin 200 can be of a single diameter, of a decreasing diameter from the proximal end 204 to the distal end 206, or a multi-step diameter molding pin, a two-step diameter molding pin is illustrated. The first portion 208 adjacent the proximal end 204 has a larger diameter d1 than the second portion 210 with the diameter d2. The shoulder 212 this position between the first portion 208 and the second portion 210. The distal end 206 as an end portion 214 to form a lens in the fiber optic ferrule. As illustrated in the figures, the end portion 214 has a chamfered area 216 to assist in inserting the molding pin 200 into the mold without skiving the mold. Radially inward from the chamfered area 216 is a concave portion 218 that forms the convex lens in the fiber optic ferrule.

In an alternative embodiment of a molding pin 200', the end portion 214' does not have the chamfered area in the prior embodiment. Rather, the concave portion 218' extends radially outward to the edges of the second portion 210'.

In yet another alternative embodiment of a molding pin 200", the end portion 214" has a flattened annular portion 216" surrounding the concave portion 218.

In all of these embodiments, it is important to note that the lenses formed by each of the molding pins would have a diameter that is less than the diameter of the second portion 210.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

I claim:

1. A fiber optic ferrule comprising:
a main body having a front end, a back end, and a middle portion disposed between the front end and back end;
a first opening through the back end of the main body, the first opening configured to receive at least two optical fibers through the back end of the main body;
a plurality of optical fiber openings disposed in the middle portion and in communication with and extending from the first opening toward the front end, each of the plurality of optical fiber openings configured to receive an optical fiber inserted through the back end and an optical fiber stop disposed within each of the plurality of optical fiber openings;
a second opening disposed between the middle portion and the front end, the second opening extending through a surface of the main body perpendicular to a front face disposed at the front end of the main body; and
a front portion, the front portion disposed between the second opening and the front end, the front portion having a plurality of lens holes, each of the plurality of lens holes corresponding to one of the plurality of optical fiber openings in the middle portion and opening into the second opening.

2. The fiber optic ferrule according to claim 1, wherein each of the plurality of lens holes has a lens, the lens in each of the plurality of lens holes is disposed between the front face of the main body and the lens hole.

3. The fiber optic ferrule according to claim 1, further comprising adhesive disposed in the second opening and the plurality of lens holes, the adhesive and the fiber optic ferrule having a refractive index that are different from one another.

4. The fiber optic ferrule according to claim 1, the further comprising adhesive disposed in the second opening and the plurality of lens holes, the adhesive and the core of the optical fibers having a refractive index that are the same.

5. The fiber optic ferrule according to claim 1, further comprising a plurality of mating surfaces disposed on the front face of the main body, each of the plurality of mating surfaces corresponding to one of the plurality of lens holes.

6. The fiber optic ferrule according to claim 5, wherein the plurality of mating surfaces have a flat forward facing surface.

7. The fiber optic ferrule according to claim 5, wherein the plurality of mating surfaces have a convex mating surface.

8. The fiber optic ferrule according to claim 1, further comprising a mating surface, the mating surface corresponds to the front face of the fiber optic ferrule.

9. The fiber optic ferrule according to claim 1, further comprising a plurality of light transmission surfaces, each of the plurality of light transmission surfaces being optically aligned with one of the plurality of lens holes and one of the plurality of optical fiber openings.

10. The fiber optic ferrule according to claim 9, wherein the plurality of light transmission surfaces comprise a plurality of mating surfaces.

11. The fiber optic ferrule according to claim 9, wherein the plurality of light transmission surfaces are recessed below a mating surface disposed on the front end of the main body.

12. A fiber optic ferrule comprising:
a main body having a front end, a back end, and a middle portion disposed between the front end and back end;
a first opening through the back end of the main body, the first opening configured to receive at least one optical fiber through the back end of the main body;
at least one optical fiber opening in communication with and extending from the first opening toward the front end, the at least one optical fiber opening configured to receive an optical fiber inserted through the back end, wherein the at least one optical fiber opening has a lens associated therewith, the lens having a convex surface that extends rearwardly from the front end towards the back end.

13. The fiber optic ferrule according to claim 12, further comprising an optical fiber stop disposed within the at least one optical fiber opening.

14. The fiber optic ferrule according to claim 12, further comprising a second opening disposed between the middle portion and the front end, the second opening extending through a surface of the main body perpendicular to a front face disposed at the front end of the main body and in communication with the at least one optical fiber opening.

15. The fiber optic ferrule according to claim 14, further comprising a front portion, the front portion disposed between the second opening and the front end, the front portion having at least one lens hole, the at least one lens hole corresponding to the at least one optical fiber opening in the middle portion and opening into the second opening and having the lens disposed therein.

16. The fiber optic ferrule according to claim 12, further comprising at least one mating surface disposed on the front face of the main body, the at least one mating surface corresponding to the at least one optical fiber receiving hole.

17. The fiber optic ferrule according to claim 12, further comprising a mating surface, the mating surface corresponds to the front face of the fiber optic ferrule.

18. The fiber optic ferrule according to claim 12, further comprising a plurality of light transmission surfaces, each of the plurality of light transmission surfaces being optically aligned with one of the plurality of lens holes and one of the plurality of optical fiber openings.

* * * * *